US009672320B2

(12) United States Patent
Chang et al.

(10) Patent No.: US 9,672,320 B2
(45) Date of Patent: Jun. 6, 2017

(54) METHOD FOR INTEGRATED CIRCUIT MANUFACTURING

(71) Applicant: Taiwan Semiconductor Manufacturing Company, Ltd., Hsin-Chu (TW)

(72) Inventors: Shih-Ming Chang, Zhubei (TW); Chien-Fu Lee, Hsinchu (TW); Chin-Yuan Tseng, Hsinchu (TW)

(73) Assignee: TAIWAN SEMICONDUCTOR MANUFACTURING COMPANY, LTD., Hsin-Chu (TW)

( * ) Notice: Subject to any disclaimer, the term of this patent is extended or adjusted under 35 U.S.C. 154(b) by 0 days.

(21) Appl. No.: 14/754,769

(22) Filed: Jun. 30, 2015

(65) Prior Publication Data

US 2017/0004242 A1  Jan. 5, 2017

(51) Int. Cl.
| | |
|---|---|
| *G06F 17/50* | (2006.01) |
| *G06F 19/00* | (2011.01) |
| *G03F 1/00* | (2012.01) |
| *G21K 5/00* | (2006.01) |

(52) U.S. Cl.
CPC ............ *G06F 17/5081* (2013.01); *G03F 1/00* (2013.01); *G06F 19/00* (2013.01); *G06F 2217/12* (2013.01); *G21K 5/00* (2013.01)

(58) Field of Classification Search
CPC .. G06F 17/5081; G06F 2217/12; G06F 19/00; G03F 1/00; G21K 5/00
USPC ................ 716/54, 55, 52, 53, 111; 430/4, 5; 378/34, 35; 700/97, 110, 120, 121
See application file for complete search history.

(56) References Cited

U.S. PATENT DOCUMENTS

| | | | | |
|---|---|---|---|---|
| 4,918,614 | A * | 4/1990 | Modarres | G06F 17/5072 716/122 |
| 5,182,718 | A * | 1/1993 | Harafuji | G03F 1/144 250/492.22 |
| 6,563,566 | B2 | 5/2003 | Rosenbluth et al. | |
| 6,892,371 | B1 * | 5/2005 | Teig | G06F 17/5077 716/129 |
| 6,938,234 | B1 * | 8/2005 | Teig | G06F 17/5077 716/129 |
| 6,957,408 | B1 * | 10/2005 | Teig | G06F 17/5077 716/129 |
| 6,957,411 | B1 * | 10/2005 | Teig | G06F 17/5077 378/35 |

(Continued)

FOREIGN PATENT DOCUMENTS

| | | |
|---|---|---|
| KR | 0120551 | 10/1997 |
| KR | 101095044 | 12/2011 |

(Continued)

*Primary Examiner* — Phallaka Kik
(74) *Attorney, Agent, or Firm* — Haynes and Boone, LLP

(57) ABSTRACT

A method of manufacturing an integrated circuit (IC) includes: receiving a target layout of the IC, decomposing the target layout into a plurality of sub-layouts for a multiple patterning process, identifying re-locatable pattern edges in the sub-layouts, and relocating the edges to improve manufacturability of the IC. In an embodiment, relocating the edges includes: choosing an evaluation index based on a target manufacturing process, moving one or more of the edges, calculating a score of manufacturability based on the evaluation index, and repeating the moving and the calculating until the score meets a threshold.

20 Claims, 11 Drawing Sheets

(56) References Cited

U.S. PATENT DOCUMENTS

| | | | | |
|---|---|---|---|---|
| 6,973,634 B1* | 12/2005 | Teig | ............... | G06F 17/5077 257/E23.151 |
| 7,013,451 B1* | 3/2006 | Teig | ............... | G06F 17/5077 716/129 |
| 7,096,449 B1* | 8/2006 | Teig | ............... | G06F 17/5077 716/129 |
| 7,117,468 B1* | 10/2006 | Teig | ............... | G06F 17/5077 716/129 |
| 7,259,373 B2* | 8/2007 | Zani | ............... | B82Y 10/00 204/192.11 |
| 7,260,790 B2* | 8/2007 | Allen | ............... | G06F 17/5081 716/135 |
| 8,601,416 B2 | 12/2013 | Kuo et al. | | |
| 8,762,900 B2 | 6/2014 | Shin et al. | | |
| 8,775,993 B2 | 7/2014 | Huang et al. | | |
| 8,887,116 B2 | 11/2014 | Ho et al. | | |
| 2004/0168144 A1* | 8/2004 | Kurose | ............... | G06F 17/5068 716/113 |
| 2007/0045534 A1 | 3/2007 | Zani et al. | | |
| 2009/0278569 A1* | 11/2009 | Taoka | ............... | E21B 43/24 326/101 |
| 2010/0067777 A1* | 3/2010 | Kodera | ............... | G03F 1/14 382/144 |
| 2011/0096309 A1* | 4/2011 | Paul Wiaux | ............... | G03F 7/70466 355/40 |
| 2012/0017194 A1* | 1/2012 | Bagheri | ............... | G06F 17/5081 716/135 |
| 2014/0101623 A1 | 4/2014 | Chen et al. | | |
| 2014/0157212 A1 | 6/2014 | Chang et al. | | |
| 2014/0201692 A1 | 7/2014 | Chen et al. | | |
| 2014/0223390 A1* | 8/2014 | Sun | ............... | G06F 17/5081 716/52 |
| 2014/0237435 A1 | 8/2014 | Chen et al. | | |
| 2014/0282337 A1 | 9/2014 | Yuh et al. | | |
| 2014/0304670 A1 | 10/2014 | Su et al. | | |
| 2014/0310675 A1 | 10/2014 | Liu et al. | | |
| 2014/0325464 A1 | 10/2014 | Hsu et al. | | |
| 2015/0089458 A1 | 3/2015 | Chang | | |

FOREIGN PATENT DOCUMENTS

| | | |
|---|---|---|
| TW | 201301070 | 1/2013 |
| TW | 201327030 | 7/2013 |
| TW | 201430903 | 8/2014 |
| TW | 201435637 | 9/2014 |

* cited by examiner

| Evaluation Index | 7A | 7B | 7C |
|---|---|---|---|
| CD var. / Overlay | 3 | 1 | 1 |
| DoF | 2 | 3 | 1 |
| ILS | 2 | 1 | 2.5 |
| MEEF | 3 | 1 | 1.5 |
| Small CD/Space | 3 | 1 | 1 |
| Min.Area | 2 | 2 | 1 |

| Total Score: | 14 | 9 | 8 |
|---|---|---|---|

FIG. 7D

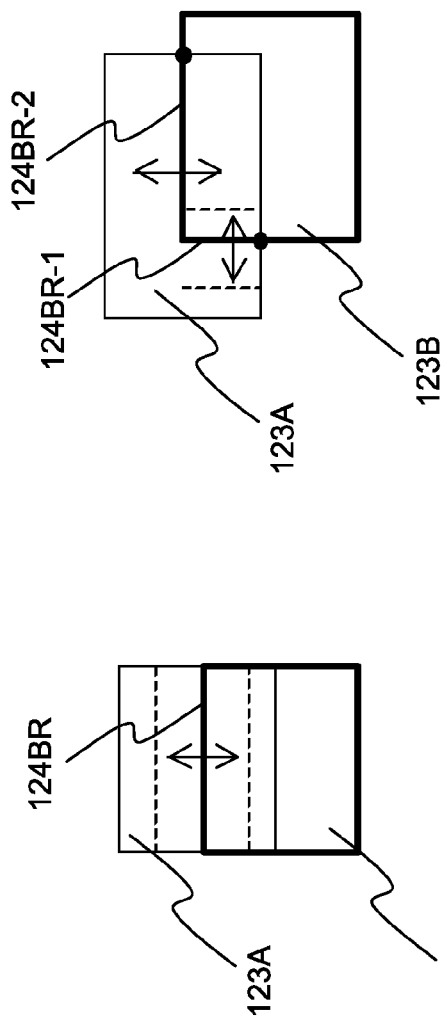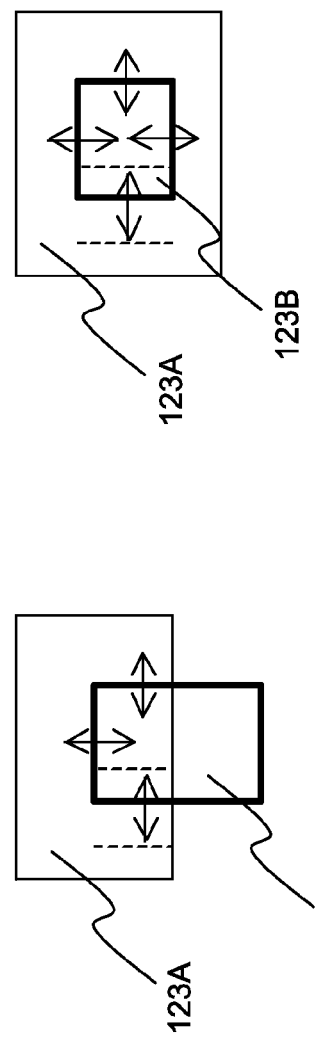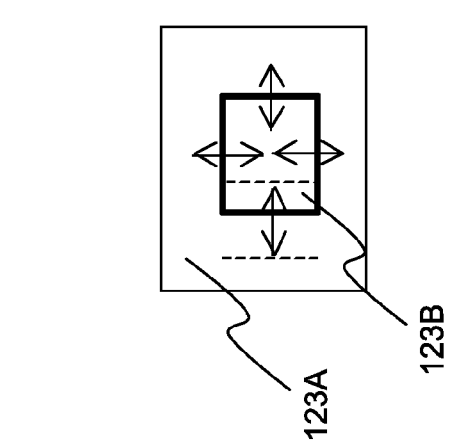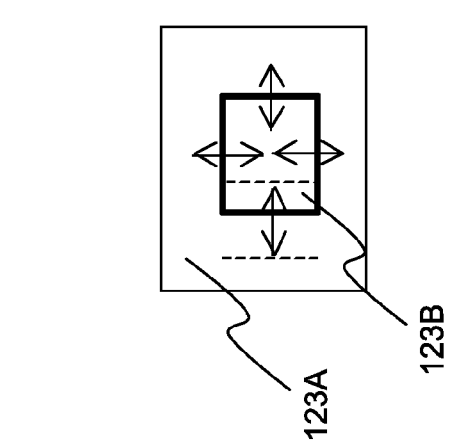

METHOD FOR INTEGRATED CIRCUIT MANUFACTURING

BACKGROUND

The semiconductor integrated circuit (IC) industry has experienced exponential growth. Technological advances in IC materials and design have produced generations of ICs where each generation has smaller and more complex circuits than the previous generation. In the course of IC evolution, functional density (i.e., the number of interconnected devices per chip area) has generally increased while geometry size (i.e., the smallest component (or line) that can be created using a fabrication process) has decreased. This scaling down process generally provides benefits by increasing production efficiency and lowering associated costs. Such scaling down has also increased the complexity of processing and manufacturing ICs.

For example, as the optical lithography approaches its technological and economical limits, multiple patterning processes are used for manufacturing patterns with small critical dimensions (CD) and/or small pitches. In a multiple patterning process, an IC layout is decomposed into two or more sub-layouts. A mask is made for each of the sub-layouts. Then the two or more masks are used to collectively manufacture (or pattern) a wafer using photolithography by overlapping an image of one mask with those of other masks onto the same layer of the wafer. Examples of such sub-layouts include main/cut layouts, mandrel/spacer/cut layouts, etc. In a multiple patterning process, merely optimizing a mask for a single patterning process is insufficient. A set of masks need to be collectively optimized to achieve a balanced performance between the individual patterning fidelity and the overlay budget among the masks.

BRIEF DESCRIPTION OF THE DRAWINGS

The present disclosure is best understood from the following detailed description when read with the accompanying figures. It is emphasized that, in accordance with the standard practice in the industry, various features are not drawn to scale and are used for illustration purposes only. In fact, the dimensions of the various features may be arbitrarily increased or reduced for clarity of discussion.

FIGS. 5A, 5B, 6A, 6B, 7A, 7B, 7C, 7D, 8A, 8B, 8C, 8D, and 9 illustrate the processing of the IC layout of FIG. 4 in a multiple patterning process, according to various aspects of the present disclosure.

DETAILED DESCRIPTION

Figure 1A:
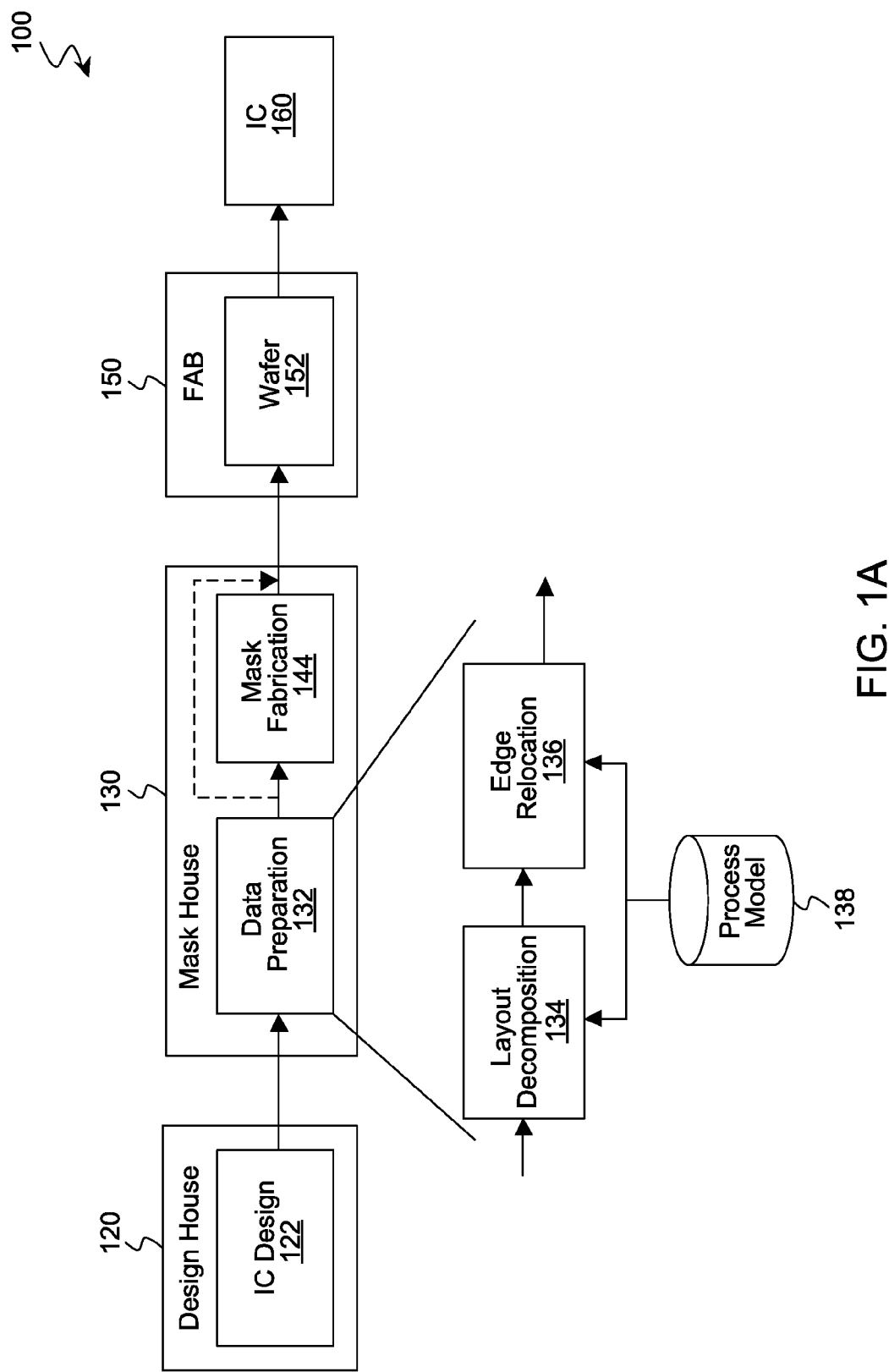
FIG. 1A is a simplified block diagram of an embodiment of an integrated circuit (IC) manufacturing system and an associated IC manufacturing flow.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

The present disclosure is generally related to methods for manufacturing semiconductor devices, and more particularly to methods of preparing design data for mask fabrication or for maskless photolithography using multiple patterning processes. In a multiple patterning process, a target layout of an IC is decomposed into multiple sub-layouts. A mask (or reticle) is fabricated for each of the sub-layouts individually, creating a set of masks. A wafer is then patterned (or printed) lithographically with the set of masks using a series of deposition, exposing, developing, and etching processes. By overlapping the images of the set of masks on the wafer, an IC with the smallest pitch smaller than the optical limits of the single exposure lithography process can be manufactured. Similarly, multiple patterning processes can be used to improve pattern fidelity on the manufactured ICs. It is an objective of the present disclosure to improve both the pattern fidelity and the manufacturability of ICs in multiple patterning processes by optimizing post-decomposition data collectively for mask fabrication. Embodiments of the present disclosure generally provide benefits to mask fabrication facilities, as well as to IC manufacturers who use maskless photolithography.

FIG. 1A is a simplified block diagram of an embodiment of an integrated circuit (IC) manufacturing system 100 and an IC manufacturing flow associated with the IC manufacturing system. The IC manufacturing system 100 may benefit from one or more aspects of the present disclosure. The IC manufacturing system 100 includes a plurality of entities, such as a design house (or design team) 120, a mask house (or mask team) 130, and an IC manufacturer (or fab) 150, that interact with one another in the design, development, and manufacturing cycles and/or services related to manufacturing an integrated circuit (IC) device 160. The plurality of entities are connected by a communications network, which may be a single network or a variety of different networks, such as a private intranet and/or the Internet, and may include wired and/or wireless communication channels. Each entity may interact with other entities and may provide services to and/or receive services from the other entities. One or more of the design house 120, the mask house 130, and the fab 150 may be owned by a single company, and may even coexist in a common facility and use common resources.

The design house 120 generates an IC design layout 122, also referred to as a target layout 122 in the present disclosure. The target layout 122 includes various geometrical patterns designed for an IC product, based on a specification of the IC product to be manufactured. The geometrical patterns correspond to patterns of metal, oxide, or semiconductor layers that make up the various components of the IC device 160 to be fabricated. The various layers combine to form various IC features. For example, a portion of the target layout 122 includes various IC features, such as an active region, gate electrode, source and drain, metal lines or vias of an interlayer interconnection, and openings for bonding pads, to be formed in a semiconductor substrate (such as a silicon wafer) and various material layers disposed on the semiconductor substrate. The target layout 122 is presented in one or more data files having information of the geometrical patterns. For example, the target layout 122 can be expressed in a GDSII file format or DFII file format.

Figure 4:
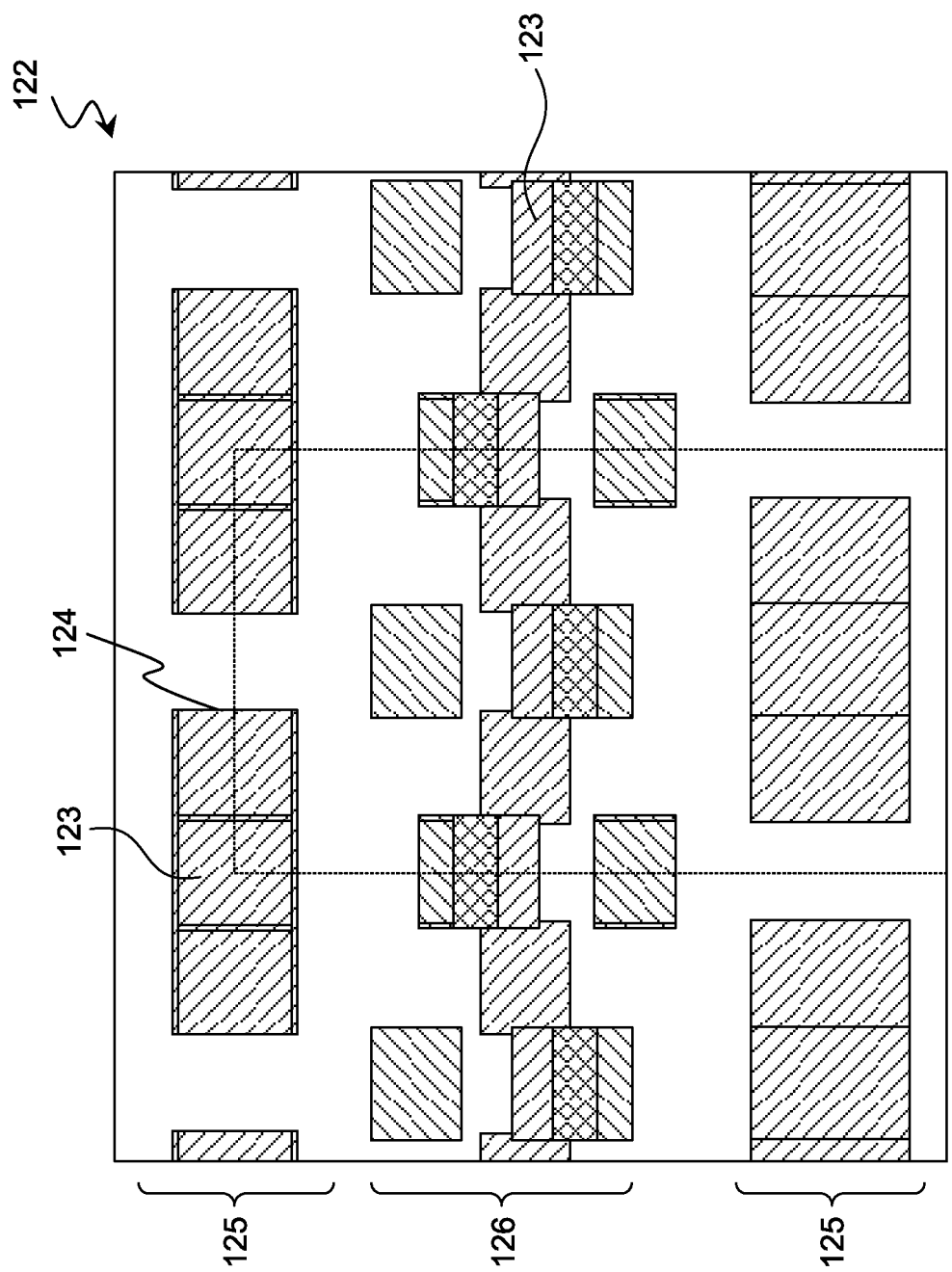
FIG. 4 is an exemplary target IC layout to be manufactured with the method of FIGS. 2 and 3, in accordance with some embodiments.

An example of the target layout 122 is shown in FIG. 4. Referring to FIG. 4, the target layout 122 includes a plurality of patterns 123. In the present embodiment, the patterns 123 are of polygonal shapes. Particularly, the patterns 123 comprise rectangular shapes. In various embodiments, the patterns 123 may be of other shapes, such as circle, ellipse, ring, hexagon, etc. Each of the patterns 123 is enclosed by a plurality of edges 124 which delineate the boundaries of the patterns 123. The patterns 123 represent IC features to be manufactured on a wafer. Some of the patterns 123, such as those in a region 125, are manufacturing friendly because they have regular shapes, large dimensions, and large spacing among patterns. It is therefore more likely that the IC features formed on a wafer using those patterns will match the shapes of the patterns in the target layout 122. In another word, the pattern fidelity will be good. However, some other patterns 123, such as those in a region 126, are not so manufacturing friendly. For one thing, the spacing among those patterns may exceed the limits that the target manufacturing process can reliably produce. Accordingly, the pattern fidelity for those patterns may not be sufficient. The present disclosure provides methods for processing a design layout, such as the target layout 122, so as to improve the pattern fidelity and the manufacturability thereof. This will be discussed in later sections.

Referring back to FIG. 1A, the mask house 130 uses the target layout 122 to fabricate one or more masks to be used for manufacturing the various layers of the IC device 160. The mask house 130 performs various tasks, including a data preparation 132 and, optionally, a mask fabrication 144. In the data preparation 132, the target layout 122 is translated into a form that can be physically written by a mask writer. In the mask fabrication 144, the design layout so prepared is modified to comply with a particular mask manufacturer and is then fabricated. In the present embodiment, the data preparation 132 and the mask fabrication 144 are illustrated as separate element. However, they can be collectively referred to as mask data preparation. In an embodiment, the IC manufacturing system 100 may employ a maskless lithography technology, such as electron beam lithography or optical maskless lithography. In such a system, the mask fabrication 144 is bypassed, and the data preparation 132 makes the target layout 122 suitable for wafer handling with the particular maskless lithography technology.

The data preparation 132 includes layout decomposition 134. In an embodiment, the layout decomposition 134 utilizes one or more multiple patterning techniques to decompose a complex layout into a set of simpler sub-layouts or to decompose a dense layout into a set of loose sub-layouts. Simpler layouts and/or loose layouts are easier to manufacture. In an embodiment, the layout decomposition 134 decomposes a layout into a main layout and a cut layout. At the fab 150, the main layout (or main pattern) is formed on the wafer 152 in a first lithography exposure, and the cut layout (or cut pattern) is then applied to remove unwanted portions of the main pattern and/or a derivative in a second lithography exposure. The final pattern of the IC 160 includes the main pattern plus the derivative but not the cut pattern. In another embodiment, the layout decomposition 134 decomposes a target layout into first and second sub-layouts that include patterns overlapping with each other. At the fab 150, patterns of the first sub-layout are formed on the wafer 152 in a first lithography process, and patterns of the second sub-layout are formed on the same layer of the wafer 152 in a second lithography process. The patterns of the two lithography processes overlap on the wafer 152. The final pattern of the IC 160 includes the overlapping portion and the non-overlapping portions of the patterns.

The data preparation 132 further includes edge relocation 136 that optimizes the various sub-layouts post-decomposition. In an embodiment, the layout decomposition 134 generates a main sub-layout and a cut sub-layout, and the edge relocation 136 optimizes the landing of the cut sub-layout edges onto the main sub-layout so that there are sufficient overlay between them. In another embodiment, the layout decomposition 134 generates first and second overlapping sub-layouts, and the edge relocation 136 optimizes the landing of the edges within the overlapping regions. As a result, not only does each of the first and second sub-layouts have sufficient process window for the fab 150, but the overlapping regions of the first and second sub-layouts also have sufficient overlay budget for the fab 150. Various embodiments of the layout decomposition 134 and the edge relocation 136 will be described in further details later.

When performing the tasks in the layout decomposition 134 and the edge relocation 136, a process model 138 may be used to run various simulations. The process model 138 may be based on actual processing parameters of the fab 150. The processing parameters can include parameters associated with various processes of the IC manufacturing cycle, parameters associated with tools used for manufacturing the IC, and/or other aspects of the manufacturing process. The process model 138 takes into account various process performance factors, such as intensity log slope (ILS), depth of focus (DOF), mask error enhancement factor (MEEF), data error enhancement factor (DEEF) in a maskless lithography, critical dimension (CD) variation budget, overlay budget, rules on minimal area, minimal CD, and minimal spacing, other suitable factors, or combinations thereof.

In embodiments, the data preparation 132 further includes optical proximity correction (OPC) (not shown). The OPC uses lithography enhancement techniques to compensate for image errors, such as those that can arise from diffraction, interference, or other process effects. The OPC may add assist features, such as scattering bars, serif, and/or hammerheads to the IC design layout 122 according to optical models or rules such that, after a lithography process, a final pattern on a wafer is improved with enhanced resolution and precision. The OPC may employ model-based correction or rule-based correction. The Data preparation 132 may include further resolution enhancement techniques (RET), such as off-axis illumination, sub-resolution assist features, phase-shifting masks, other suitable techniques, or combinations thereof.

It should be understood that the above description of the data preparation 132 has been simplified for the purposes of clarity, and the data preparation 132 may include additional features such as a logic operation (LOP) to modify the IC design layout 122 according to manufacturing rules. Additionally, the processes applied to the IC design layout 122 during data preparation 132 may be executed in a variety of different orders.

After the data preparation 132 modifies the IC design layout 122, the results are stored in one or more data files, such as a file in a GDSII file format or DFII file format. The one or more data files include information of geometrical patterns, such as polygons representing main design patterns and/or assist features. The data files are handed over to the mask fabrication 144, or directly to the fab 150 in a maskless lithography process. At the mask fabrication 144, a mask or a group of masks are fabricated based on the modified IC design layout. For example, an electron-beam (e-beam) or a mechanism of multiple e-beams is used to form a pattern on a mask (photomask or reticle) based on the modified IC design layout. The mask can be formed in various technologies. In an embodiment, a mask pattern includes opaque regions and transparent regions. A radiation beam, such as an ultraviolet (UV) beam, used to expose the image sensitive material layer (e.g., photoresist) coated on a wafer, is blocked by the opaque region and transmits through the transparent regions. In one example, a binary mask includes a transparent substrate (e.g., fused quartz) and an opaque material (e.g., chromium) coated in the opaque regions of the mask. In another example, the mask is formed using a phase shift technology. In the phase shift mask (PSM), various features in the pattern formed on the mask are configured to have proper phase difference to enhance the resolution and imaging quality. In various examples, the phase shift mask can be attenuated PSM or alternating PSM as known in the art. In an embodiment, the mask is an extreme ultraviolet (EUV) mask which is a reflective mask in that some portions of its top surface reflect radiation projected thereon in forming an aerial image of IC patterns to be printed on a target, such as the wafer 152. The EUV mask may incorporate resolution enhancement techniques such as phase-shifting mask (PSM) and/or optical proximity correction (OPC).

The fab 150, such as a semiconductor foundry, uses the mask (or masks) fabricated by the mask house 130 to manufacture the IC device 160. Alternatively, the fab 150 may use data prepared by the mask house 130 to manufacture the IC device 160 using some maskless lithography technology, such as electron beam direct write (EBDW) lithography. The fab 150 is an IC fabrication business that can include a myriad of manufacturing facilities for the fabrication of a variety of different IC products. For example, there may be a manufacturing facility for the front end fabrication of a plurality of IC products (i.e., front-end-of-line (FEOL) fabrication), while a second manufacturing facility may provide the back end fabrication for the interconnection and packaging of the IC products (i.e., back-end-of-line (BEOL) fabrication), and a third manufacturing facility may provide other services for the foundry business. In the present embodiment, a semiconductor wafer 152 is manufactured to form the IC device 160 using one or more lithography processes such as deep ultraviolet (DUV) lithography, immersion lithography, extreme ultraviolet (EUV) lithography, electron beam lithography, x-ray lithography, ion beam lithography, and other suitable lithography techniques. The semiconductor wafer 152 includes a silicon substrate or other proper substrate having material layers formed thereon. Other proper substrate materials include another suitable elementary semiconductor, such as diamond or germanium; a suitable compound semiconductor, such as silicon carbide, indium arsenide, or indium phosphide; or a suitable alloy semiconductor, such as silicon germanium carbide, gallium arsenic phosphide, or gallium indium phosphide. The semiconductor wafer 152 may further include various doped regions, dielectric features, and multilevel interconnects (formed at subsequent manufacturing steps). The mask may be used in a variety of processes. For example, the mask may be used in an ion implantation process to form various doped regions in the semiconductor wafer, in an etching process to form various etching regions in the semiconductor wafer, and/or other suitable processes.

Figure 1B:
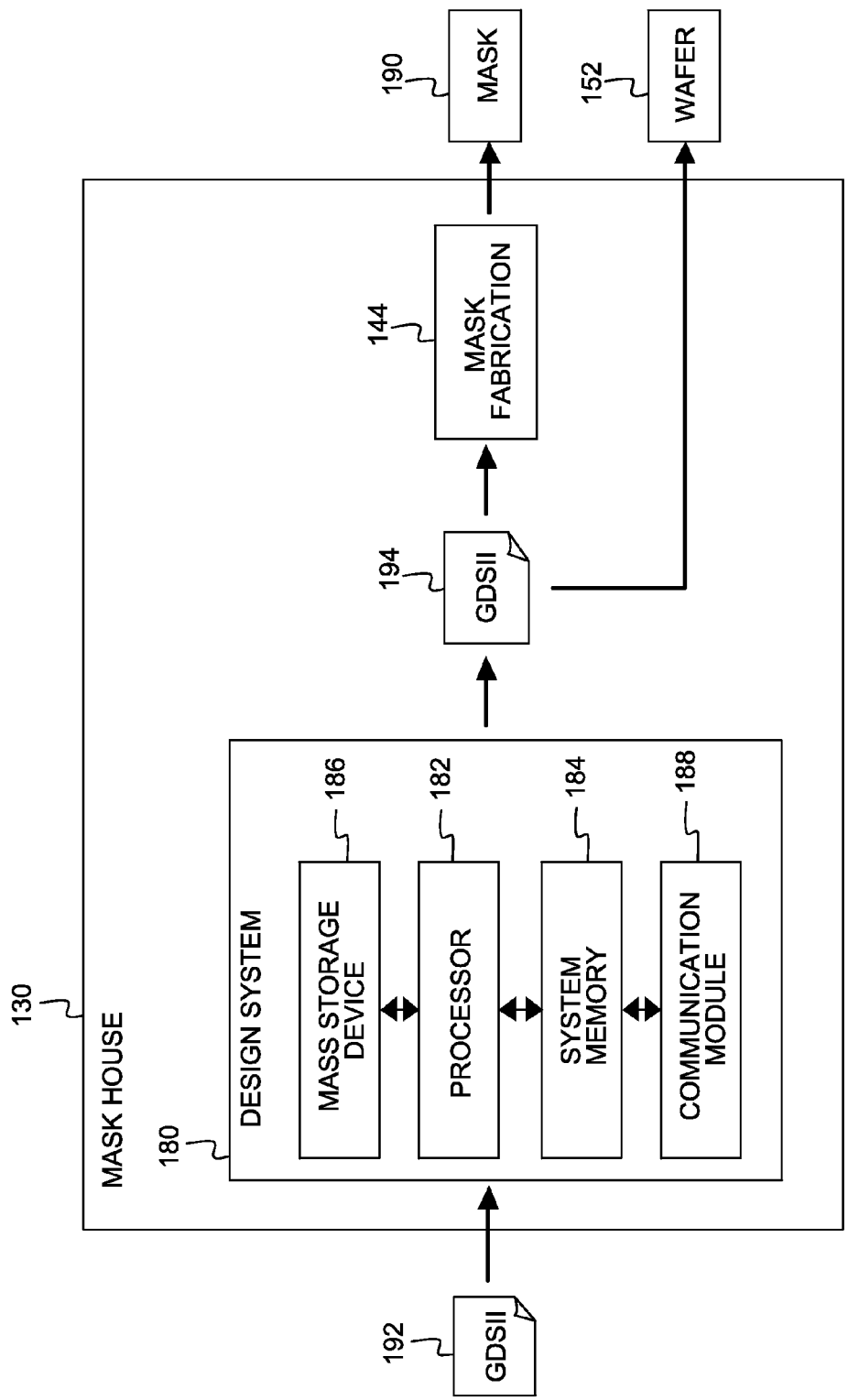
FIG. 1B is a more detailed block diagram of the mask house shown in FIG. 1A according to various aspects of the present disclosure.

FIG. 1B is a more detailed block diagram of the mask house 130 shown in FIG. 1A according to various aspects of the present disclosure. In the illustrated embodiment, the mask house 130 includes a design system 180 that is operable to perform the functionality described in association with the data preparation 132 of FIG. 1A. The design system 180 is an information handling system such as a computer, server, workstation, or other suitable device. The system 180 includes a processor 182 that is communicatively coupled to a system memory 184, a mass storage device 186, and a communication module 188. The system memory 184 provides the processor 182 with non-transitory, computer-readable storage to facilitate execution of computer instructions by the processor. Examples of system memory may include random access memory (RAM) devices such as dynamic RAM (DRAM), synchronous DRAM (SDRAM), solid state memory devices, and/or a variety of other memory devices known in the art. Computer programs, instructions, and data are stored on the mass storage device 186. Examples of mass storage devices may include hard discs, optical disks, magneto-optical discs, solid-state storage devices, and/or a variety other mass storage devices known in the art. The communication module 188 is operable to communicate information such as IC design layout files with the other components in the IC manufacturing system 100, such as design house 120. Examples of communication modules may include Ethernet cards, 802.11 WiFi devices, cellular data radios, and/or other suitable devices known in the art.

In operation, the design system 180 is configured to manipulate the IC design layout 122 according to a variety of design rules and limitations. For example, in an embodiment, the data preparation 132 may be implemented as software instructions executing on the design system 180. In such an embodiment, the design system 180 receives a first GDSII file 192 containing the target layout 122 from the design house 120. After the data preparation 132 completes, the design system 180 transmits a second GDSII file 194 containing a modified layout to the mask fabrication 144 which fabricates one or more masks 190. In alternative embodiments, the IC design layout may be transmitted between the components in IC manufacturing system 100 in alternate file formats such as DFII, CIF, OASIS, or any other suitable file type. It is understood that the design system 180 and the mask house 130 may include additional and/or different components in alternative embodiments.

Figure 2:
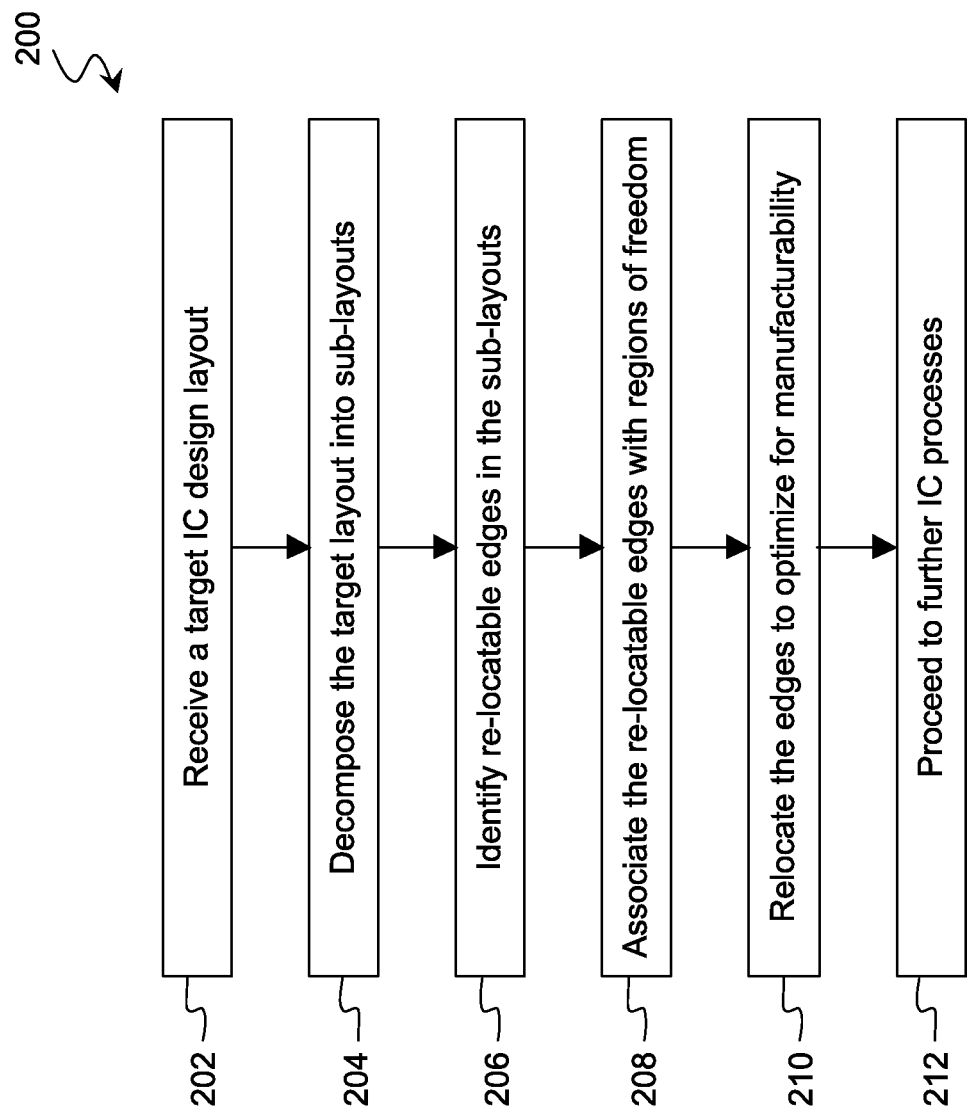
FIG. 2 shows a flow chart of a method of manufacturing a semiconductor device, according to various aspects of the present disclosure.

FIG. 2 shows a flow chart of a method 200 of forming a semiconductor device according to various aspects of the present disclosure. An operation 210 of the method 200 is further illustrated in FIG. 3, according to an embodiment.

The method 200 is merely an example, and is not intended to limit the present disclosure beyond what is explicitly recited in the claims. Additional operations can be provided before, during, and after the method 200, and some operations described can be replaced, eliminated, or moved around for additional embodiments of the method. The method 200 may be implemented by one or more entities in the IC manufacturing system 100. Particularly, embodiments of the method 200 may be implemented in the design system 180. The method 200 is described below in conjunction with FIGS. 1A-9.

Referring to FIG. 2, at operation 202, the method 200 (FIG. 2) receives an IC design layout, such as the IC design layout 122 shown in FIG. 4. Referring to FIG. 4, the IC design layout 122 includes a plurality of IC patterns 123. Each of the patterns 123 is a geometrical shape enclosed within a plurality of edges 124. The IC design layout 122 includes different portions or regions, for example, regions 125 and 126. The patterns 123 in the region 125 have regular shapes, large dimensions, and large spacing among the patterns. These patterns are generally manufacturing friendly in a target photolithography process in the fab 150. In contrast, the patterns 123 in the region 126 may present challenges to a photolithography process due to their irregular shapes and smaller spacing. Some of the critical dimensions (CD) or the spacing may be too small to be manufactured. To solve such a problem, the method 200 uses a multiple patterning process, as described below.

Figure 5B:
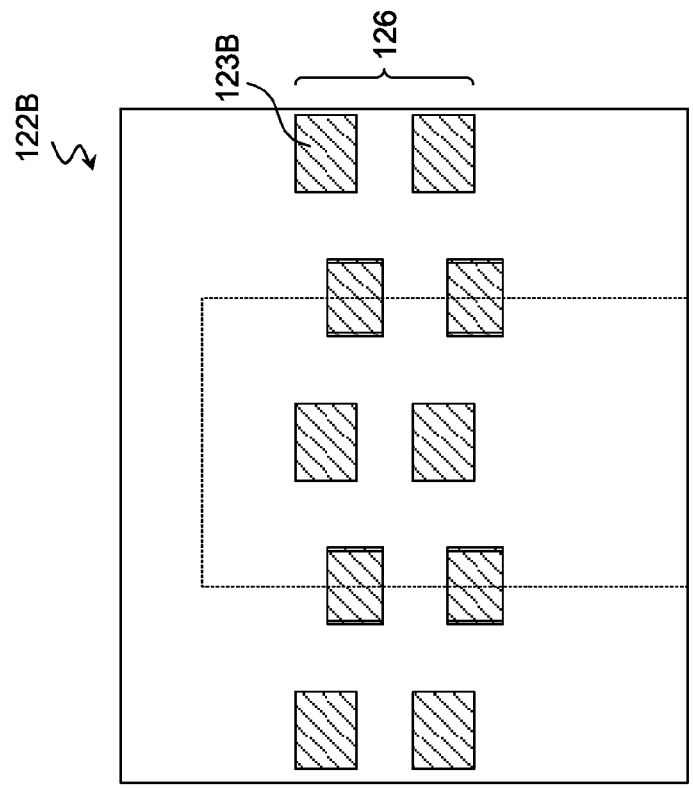
Figure 5A:
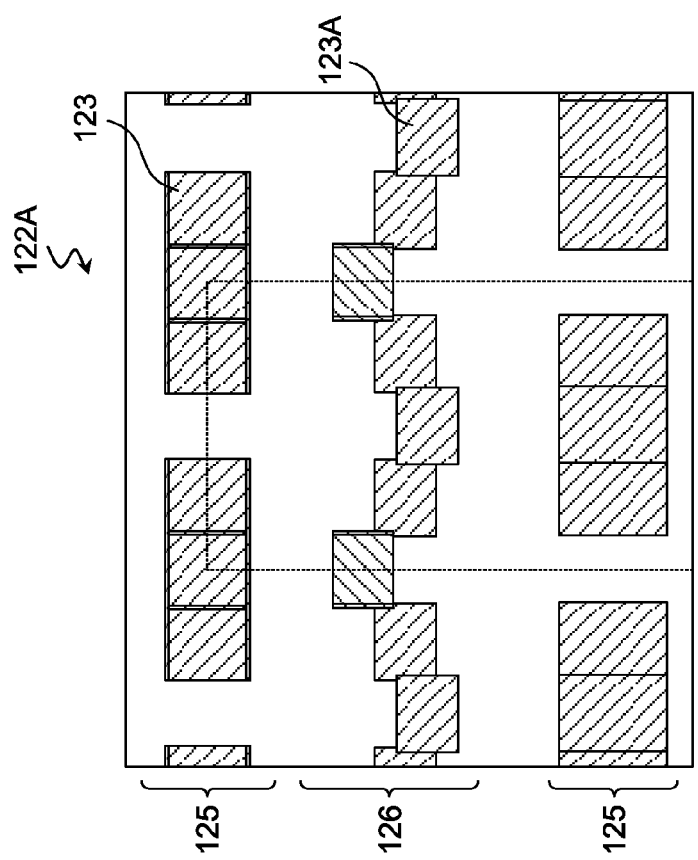

At operation 204, the method 200 (FIG. 2) decomposes the target layout 122 into sub-layouts that will collectively form the target IC design layout on the wafer 152. In the present embodiment, the method 200 decomposes the target layout 122 into two sub-layouts, 122A and 122B, as shown in FIGS. 5A and 5B. Referring to FIG. 5A, the sub-layout 122A includes the patterns 123 in the regions 125, and patterns 123A in the region 126. The patterns 123A are a portion of the patterns 123 in the region 126. Referring to FIG. 5B, the sub-layout 122B includes patterns 123B in the region 126. The patterns 123B are another portion of the patterns 123 in the region 126. The patterns 123A and 123B, when overlapping, form the patterns 123 in the region 126. The region 126 is also referred to as "the overlapping region" because it exists in both the sub-layouts 122A and 122B, while the region 125 is also referred to as "the independent region" because it exists in only one of the sub-layouts. Compared with the target layout 122, the sub-layouts 122A and 122B have more regular shapes and larger spacing among the shapes, thereby providing better manufacturability.

In various embodiments, the method 200 may decompose the IC design layout 122 into two, three, or more sub-layouts. The decomposition may take into account various factors including the characteristics of the patterns 123, the target manufacturing capability of the fab 150, and the manufacturing process window factors. For example, the characteristics of the patterns may include the complexity, critical dimension (CD), and spacing of the patterns. For example, the target manufacturing capability may include illumination source, optical system polarization, optical depth of focus (DOF), illumination intensity log slope (ILS), and the film stacks on the wafers to be manufactured. For example, the process window factors may include CD variation budget, overlay budget, mask error enhancement factor (MEEF), data error enhancement factor (DEEF) for maskless lithography, minimal area of a pattern, minimal CD of a pattern, and minimal spacing among patterns.

The decomposition of the target layout 122 into the sub-layouts 122A and 122B is an initial decomposition. As such, some pattern shapes and/or positions can be further optimized according to an evaluation index. In an embodiment, the evaluation index includes one or more performance factors selected from the group consisting of: CD variation budget, overlay budget, DOF, ILS, MEEF, DEEF, minimal area, minimal CD, and minimal spacing. It is often observed that when a pattern (including its shapes, dimensions, spacing, etc.) is optimized for one performance factor, the same pattern may advance or hinder another performance factor. Further, the patterns 123A and the patterns 123B have inter-dependency too. Therefore, optimizing the patterns 123A and 123B should be collectively considered, as will be discussed below.

Figure 6A:
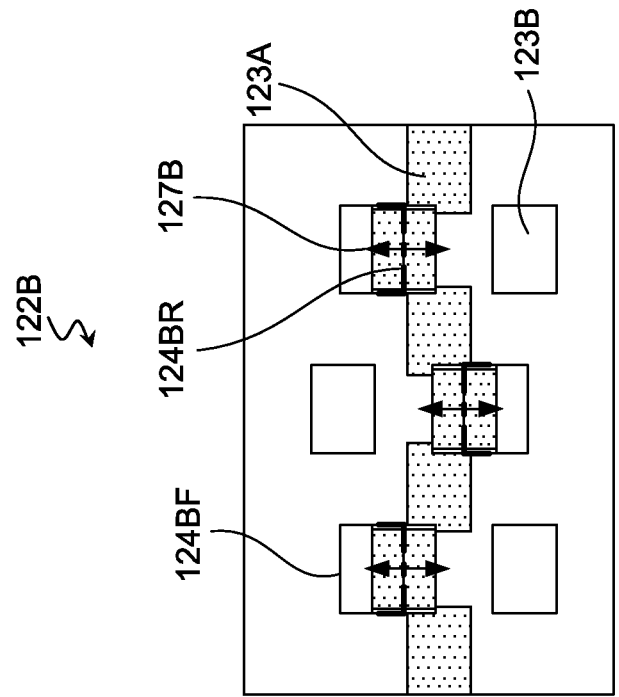
Figure 6B:
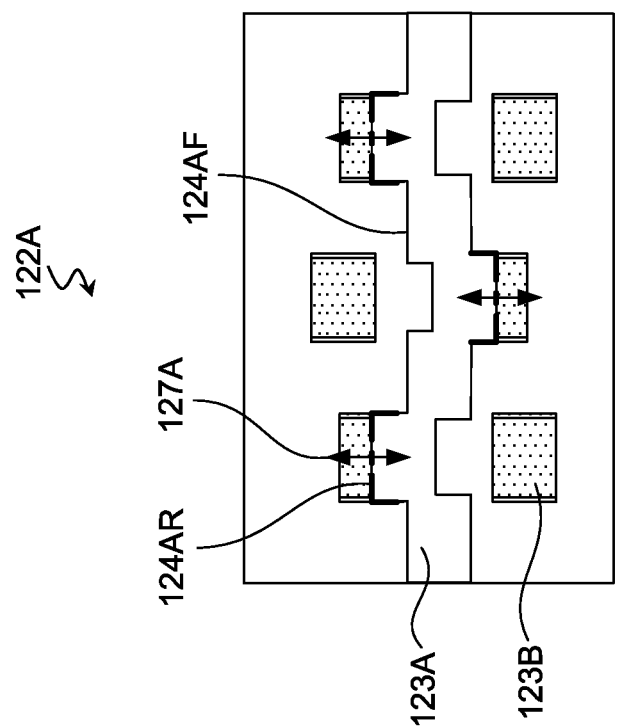

At operation 206, the method 200 (FIG. 2) identifies re-locatable edges in the sub-layouts 122A and 122B. Some examples of the re-locatable edges are shown in FIGS. 6A and 6B. For the sake of simplicity, only a portion of the patterns 123A and 123B are shown in each of the FIGS. 6A and 6B.

Referring to FIG. 6A, the patterns 123A are the patterns to be formed for the sub-layout 122A, while the patterns 123B are only shown for illustrative purposes. The patterns 123A and 123B overlap in some regions. Some edges 124AR of the patterns 123A, illustrated with dashed lines in FIG. 6A, are in the overlapping regions. These edges are referred to as the "re-locatable" edges, as they may move along the directions indicated with arrows 127A up to certain distance without changing the composite layout when the sub-layouts 122A and 122B are superimposed onto each other. Some edges (e.g., edge 124AF) of the patterns 123A are fixed (not re-locatable). These edges are expected to be fixed at certain locations after lithography patterning processes. In embodiments, the locations of the fixed edges may be modified by OPC to ensure that they assume certain position after the lithography patterning processes.

Referring to FIG. 6B, re-locatable edges 124BR for the patterns 123B are similarly identified (the dashed lines). The patterns 123A are shown for illustrative purposes only. The edges 124BR may move along the directions indicated with arrows 127B up to certain distance without changing the composite layout when the sub-layouts 122A and 122B are superimposed onto each other. Similarly, edge 124BF is an example of fixed edges in the sub-layout 122B.

At operation 208, the method 200 (FIG. 2) associates each of the re-locatable edges with a respective region of freedom, within which the edge is to be repositioned for optimization purposes. Still referring to FIGS. 6A and 6B, the regions of freedom for the re-locatable edges 124AR and 124BR are indicated with the length of the arrows 127A and 127B respectively. They are further limited by the dimensions of the overlapping patterns, i.e. the re-locatable edges 124AR (124BR) do not move outside the corresponding patterns 123B (123A). Therefore, the movements of the re-locatable edges 124AR and 124BR have inter-dependency and are considered collectively.

At operation 210, the method 200 (FIG. 2) relocates one or more of the re-locatable edges 124AR and 124BR to optimize the sub-layouts 122A and 122B for manufacturability. The relocation of the edges is limited to their respective regions of freedom. In an embodiment, this involves multiple iterative loops. During each loop, some tentative relocation is proposed and a target function is evaluated (i.e., to calculate a score), taking into account the characteristics of the patterns and the target manufacturing process. If the tentative relocation improves the score, it is carried out to modify the sub-layouts 122A and 122B. In an embodiment, the iterative loop is terminated once the score reaches a user-defined threshold, i.e. the modified sub-layouts are considered satisfying the criteria for the target manufacturing process. In another embodiment, the iterative loop is terminated when the score reaches a local optimum or a global optimum.

Figure 3:
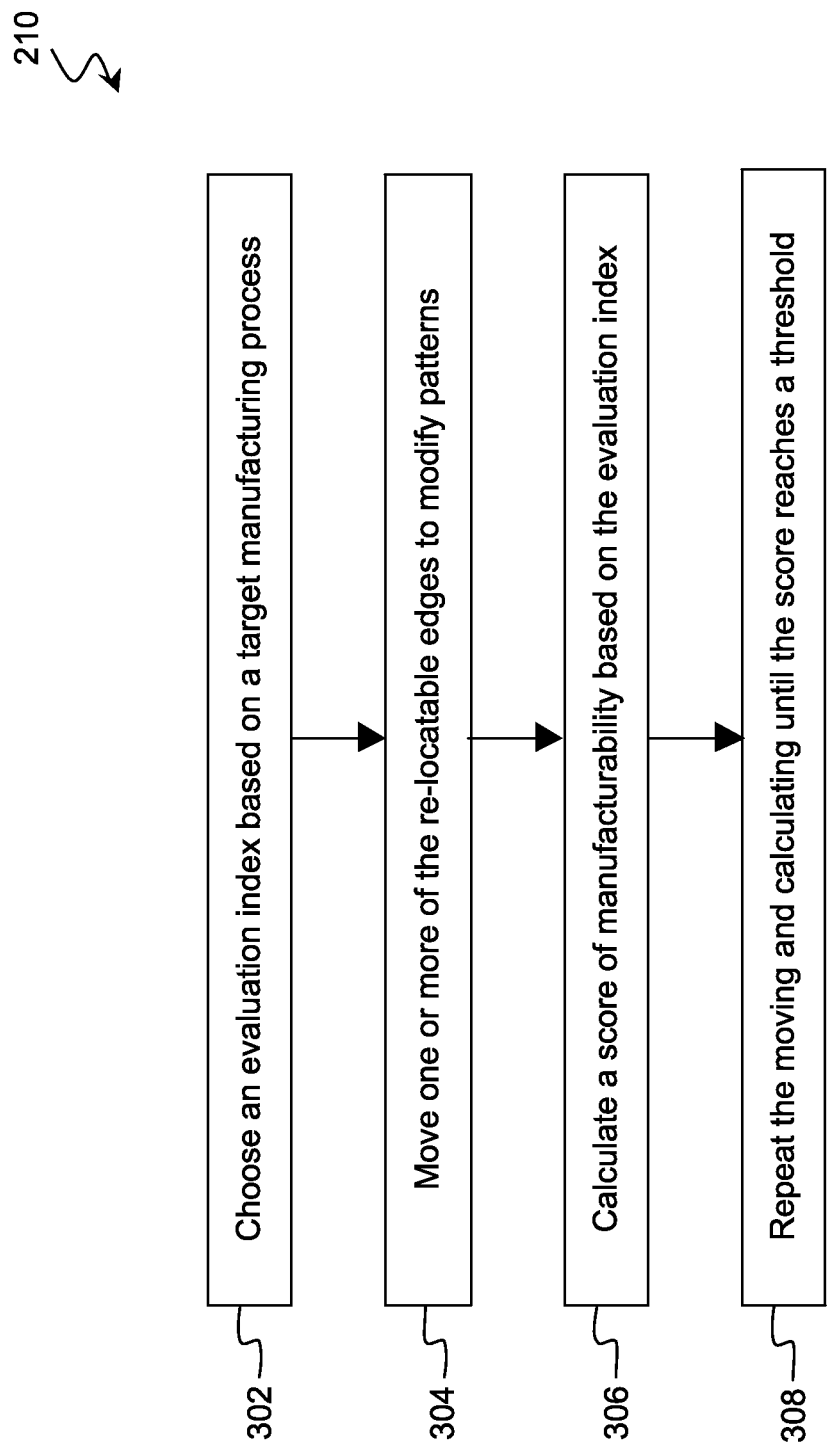
FIG. 3 shows a flow chart of a method of relocating pattern edges for optimizing IC manufacturability, according to some aspects of the present disclosure.

An embodiment of the operation 210 is further shown as a flow chart in FIG. 3. Referring to FIG. 3, the operation 210 chooses (step 302) an evaluation index based on a target manufacturing process. The evaluation index may be used to construct a target function. In an embodiment, the evaluation index includes one or more factors selected from the group consisting of: CD variation budget, overlay budget, DOF, ILS, MEEF, DEEF (for maskless lithography), minimal area, minimal CD, and minimal spacing. In an embodiment, the evaluation index is weighted, i.e., a weight is assigned to each of the performance factors selected from the above so that the optimization may favor certain solution spaces. In another embodiment, the evaluation index includes the edge placement error (EPE). To further this embodiment, the after-development locations of fixed edges is taken into account by the operation 210. For example, movements of the re-locatable edges 124AR (FIG. 6A) may affect how OPC handles the fixed edges 124AF which in turn may affect the placement of the fixed edges after the final lithography patterning processes.

Still referring to FIG. 3, the operation 210 moves (step 304) one or more of the re-locatable edges 124AR and 124BR to modify the patterns in the sub-layouts 122A and 122B. In an embodiment, the operation 210 may fix the edges in the sub-layout 122A (122B) in their initial locations and only move the edges in the sub-layout 122B (122A). In another embodiment, the operation 210 may move the edges in the sub-layouts 122A and 122B simultaneously. Furthermore, the operation 210 may selectively move some, but not all, edges.

Figure 7A:
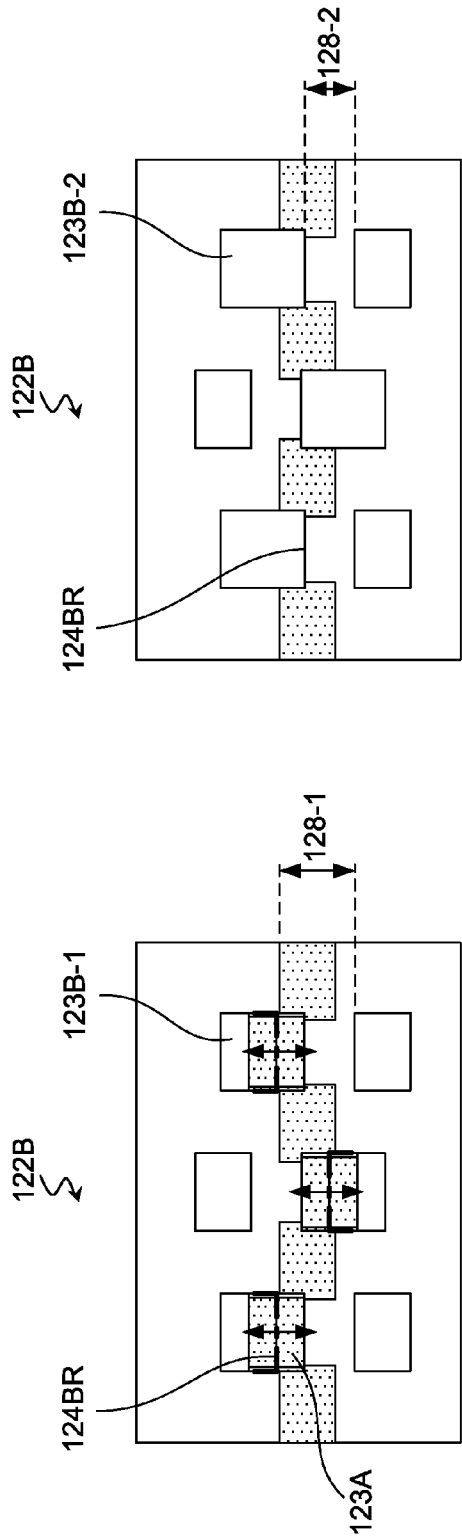
Figure 7B:
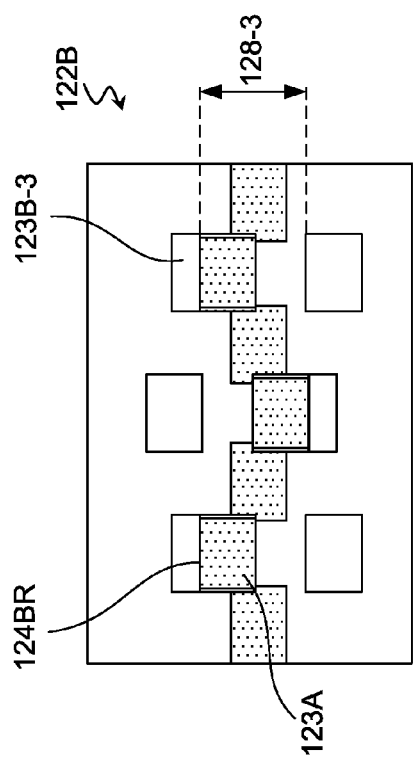
Figure 7C:
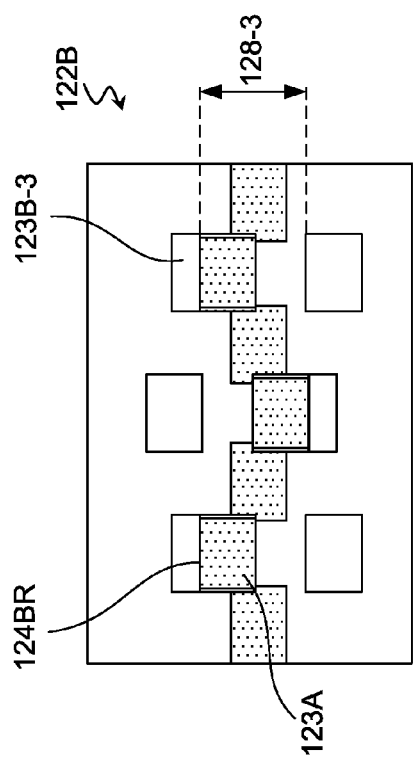

FIGS. 7A-7C illustrates three exemplary tentative relocations of the edges 124BR with respect to the sub-layout 122B. Referring to FIG. 7A, the edges 124BR are placed in the center of the overlapping (or conjugate) pattern 123A. The resulting patterns 123B are labeled as 123B-1 for convenience. The patterns 123B-1 have a vertical spacing 128-1. Referring to FIG. 7B, the edges 124BR are placed at or near one edge of the conjugate patterns 123A so that the resulting patterns 123B-2 have the maximum overlapping with the conjugate pattern 123A. The patterns 123B-2 have a vertical spacing 128-2 that is smaller than the spacing 128-1. Referring to FIG. 7C, the edges 124BR are placed at or near another edge of the conjugate patterns 123A so that the resulting patterns 123B-3 have the minimum overlapping with the conjugate patterns 123A. The patterns 123B-3 have a vertical spacing 128-3 that is greater than the spacing 128-1.

The different positions of the edges 124BR as shown in FIGS. 7A-7C have different implications to a target manufacturing process. For example, the arrangement in FIG. 7A provides larger process window for CD variations and overlay budget than the other two arrangements when the sub-layouts 122A and 122B are overlaid during photolithography processes. The arrangement in FIG. 7A also benefits some other performance factors. For example, it provides better MEEF than the other two arrangements because it offers larger spacing than the arrangement in FIG. 7B and larger CD than the arrangement in FIG. 7C. For the same reasons, it provides better performance when the requirements of minimal CD and/or minimal spacing are of particular concern for the target manufacturing process. On the other hand, the arrangement in FIG. 7B provides better depth of focus (DOF) due to the relatively larger areas of the patterns 123B-2, and the arrangement in FIG. 7C provides better intensity log slope (ILS) due to the relatively larger spacing 128-3. A further observation is that the arrangement in FIGS. 7A and 7B provide better performance than that in FIG. 7C when the requirements of minimal area are of particular concern for the target manufacturing process. For a given target manufacturing process, one or more of the above performance factors may be considered together to calculate a score (step 306 of FIG. 3) for measuring the manufacturability of the different arrangement. An example is illustrated in FIG. 7D.

Referring to FIG. 7D, in the embodiment as shown, the evaluation index includes the following performance factors: CD variation budget, overlay budget, DOF, ILS, MEEF, minimal CD, minimal spacing, and minimal area. A score on the scale of 1-3 is given for each of the performance factors and for each of the arrangements in FIGS. 7A-7C. A total score is then calculated for each of the arrangement s. In the example shown, the three arrangements in FIGS. 7A-7C accumulate a total score of 14, 9, and 8 respectively. Therefore, the arrangement in FIG. 7A is preferred over the other two arrangements for this evaluation index. In an embodiment, different weights may be assigned to the various performance factors, which may guide the optimization process towards certain solution spaces. For example, if the depth of focus is assigned a greater weight than other factors, the arrangement in FIG. 7B may accumulate a higher total score than the other two and therefore be chosen as the solution.

In embodiments, the steps of moving the edges (the step 304 of FIG. 3) and calculating the score (the step 306 of FIG. 3) are repeated in order to find an acceptable solution which may be a local optimum for the evaluation index, a global optimum for the evaluation index, or a solution meeting a pre-defined threshold though not optimal either locally or globally. This is shown as the step 308 in FIG. 3. The solution space for the operation 210 is constrained by the inter-dependency of the sub-layouts 122A and 122B and the inter-dependency of the various performance factors.

In the examples shown in FIGS. 7A-7C, all the patterns are polygons and are in the shape of rectangles. Furthermore, each of the patterns includes at most one re-locatable edge. This simplifies the optimization process. However, this does not limit the present disclosure. In various embodiments, the patterns may be of any polygonal shapes such as triangle, pentagon, and hexagon, and may include convex polygons, non-convex polygons, simple polygons, and non-simple polygons. Furthermore, a pattern may include two or more re-locatable edges or edge segments. This is illustrated in FIGS. 8A-8D. In FIG. 8A, the pattern 123B includes one re-locatable edge 124BR whose direction of movement and region of freedom are indicated by the double-sided arrow and the dashed lines respectively. In FIG. 8B, the pattern 123B includes two re-locatable edge segments 124BR-1 and 124BR-2, each of which is only a portion of an edge. The edge segments 124BR-1 and 124BR-2 have respective regions of freedom in the overlapping region between the pattern 123B and its conjugate pattern 123A. In such a case, relocation of the edge segments 124BR-1 and/or 124BR-2 may modify the pattern 123B from a rectangle to a pentagon or a hexagon. Similarly, the pattern 123B in FIG. 8C includes three re-locatable edge segments and the pattern 123B in FIG. 8D includes four re-locatable edges. Again, FIGS. 8A-8D are non-limiting examples.

Figure 9:
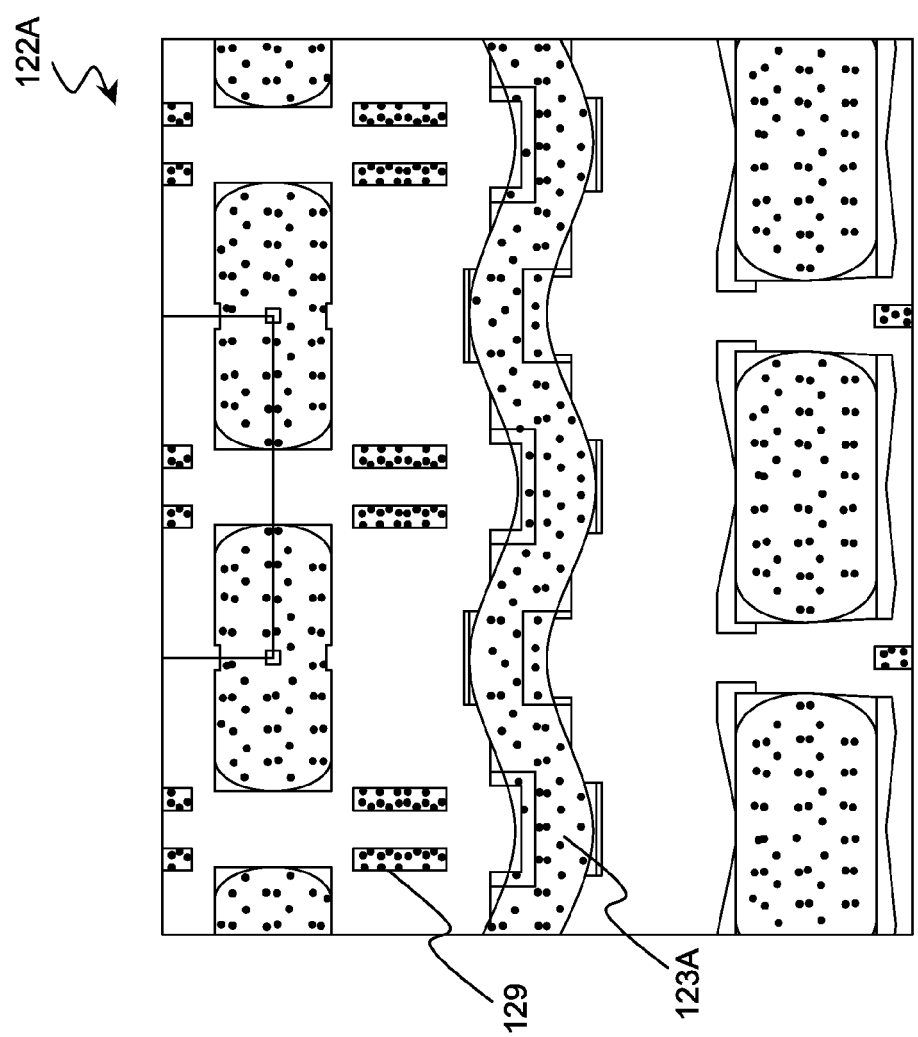

Referring back to FIG. 2, after an acceptable solution for relocating the edges has been found and implemented, the method 200 proceeds to further IC process stages (operation 212). In an embodiment, the method 200 stores the modified sub-layouts 122A and 122B in a tangible computer-readable medium that can be used by another IC process stage. In an embodiment, OPC is performed to the modified sub-layouts 122A and 122B. The OPC may further modify the patterns 123A and 123B to compensate for image errors, such as those that can arise from diffraction, interference, or other process effects. The OPC may add assist features, such as scattering bars, serif, and/or hammerheads to the sub-layouts 122A and 122B. This is illustrated in FIG. 9. Referring to FIG. 9, the contours (outer edges) of the patterns 123A have been modified, and assist features 129 have been inserted into the sub-layout 122A. Though not shown, the sub-layout 122B may be modified similarly by the OPC.

In an embodiment, the method 200 proceeds to forming masks using the modified sub-layouts 122A and 122B. In an example, it forms a first mask using the modified sub-layout 122A and a second mask using the modified sub-layout 122B. The masks may be a deep ultraviolet (DUV) mask or a EUV mask, and may further include enhancement features, such as phase-shifting features. In an example, the method 200 further performs photolithography processes with the masks to form the IC 160. For example, it performs a first photolithography process to a wafer using the first mask and then performs a second photolithography process to the same wafer using the second mask. In the first photolithography process, a material layer on the wafer is patterned with the modified sub-layout 122A through one or more of deposition, exposure, developing, and etching processes. In the second photolithography process, the same material layer is then patterned with the modified sub-layout 122B through one or more of deposition, exposure, developing, and etching processes. As a result, the two photolithography processes collectively pattern the material layer to form IC features that closely match the target layout 122 of FIG. 4.

In another embodiment, the method 200 proceeds to patterning a wafer using the modified sub-layouts 122A and 122B without fabricating a mask (maskless lithography). For example, the method 200 may use electron beam direct write (EBDW) techniques to pattern the wafer. In this regard, the method 200 performs a first maskless photolithography process to a wafer using the modified sub-layout 122A, and subsequently performs a second maskless photolithography process to the wafer using the modified sub-layout 122B. The two photolithography processes collectively form IC features that closely match the target layout 122 of FIG. 4.

Although not intended to be limiting, one or more embodiments of the present disclosure provide many benefits to the manufacturing of a semiconductor device. For example, embodiments of the present disclosure may be implemented in a multiple patterning process to decompose a complex layout into a set of simpler layouts and to further optimize the set of simpler layouts collectively. As a result, the manufacturability of the complex layout is improved.

In one exemplary aspect, the present disclosure is directed to a method. The method includes receiving a target layout of an integrated circuit (IC); and decomposing the target layout into a plurality of sub-layouts for a multiple patterning process, wherein the sub-layouts include a plurality of pattern edges, each of which is re-locatable within a respective region of freedom. The method further includes relocating the pattern edges to improve manufacturability of the IC, resulting in modified sub-layouts, and storing the modified sub-layouts in a tangible computer-readable medium for use by a further IC process stage.

In another exemplary aspect, the present disclosure is directed to a method. The method includes receiving a target layout of an integrated circuit (IC); and decomposing the target layout into first and second sub-layouts. Polygon patterns of the first sub-layout overlap with polygon patterns of the second sub-layout. The first and second sub-layouts include first and second pluralities of re-locatable edges respectively. Each of the edges is associated with a respective region of freedom where the edge can be placed. The method further includes performing an edge-relocation process to the first and second pluralities of edges thereby resulting in first and second modified sub-layouts respectively. The edge-relocation process includes choosing an evaluation index based on a target manufacturing process, moving one or more of the edges in their respective regions of freedom, calculating a score of manufacturability based on the evaluation index, and repeating the moving and the calculating until the score meets a threshold. The method further includes forming a first mask using the first modified sub-layout, and forming a second mask using the second modified sub-layout. The first and second masks are to be used in first and second manufacturing processes to a wafer to collectively form the IC.

In another exemplary aspect, the present disclosure is directed to a method. The method includes receiving a target layout of an integrated circuit (IC), and decomposing the target layout into a first sub-layout and a second sub-layout, wherein some patterns of the first sub-layout overlaps with some patterns of the second sub-layout. The method further includes identifying a plurality of re-locatable edges in the first and second sub-layouts, associating each of the re-locatable edges with a respective region of freedom where the edge can be placed, and performing an edge-relocation process to the re-locatable edges thereby resulting in first and second modified sub-layouts respectively. The edge-relocation process includes choosing an evaluation index based on a target manufacturing process, moving one or more of the edges in their respective regions of freedom, calculating a score of manufacturability based on the evaluation index, and repeating the moving and the calculating until the score reaches a local optimum. The method further includes performing a first target manufacturing process to a wafer using the first modified sub-layout, and performing a second target manufacturing process to the wafer using the second modified sub-layout. The first and second manufacturing processes collectively form the IC on the wafer.

The foregoing outlines features of several embodiments so that those of ordinary skill in the art may better understand the aspects of the present disclosure. Those of ordinary skill in the art should appreciate that they may readily use the present disclosure as a basis for designing or modifying other processes and structures for carrying out the same purposes and/or achieving the same advantages of the embodiments introduced herein. Those of ordinary skill in the art should also realize that such equivalent constructions do not depart from the spirit and scope of the present disclosure, and that they may make various changes, substitutions, and alterations herein without departing from the spirit and scope of the present disclosure.

What is claimed is:

1. A method comprising:
  receiving a target layout of an integrated circuit (IC);
  decomposing the target layout into a plurality of sub-layouts by a design system for a multiple patterning process, wherein the sub-layouts include a plurality of pattern edges, each of which is re-locatable within a respective region of freedom;

relocating the pattern edges by the design system to improve manufacturability of the IC, resulting in modified sub-layouts, wherein the relocating of the pattern edges includes:
choosing an evaluation index based on a target manufacturing process,
moving one or more of the pattern edges in their respective regions of freedom, wherein the moving of the one or more of the pattern edges has an impact on a value of the evaluation index,
calculating a score based on the evaluation index and the pattern edges, and
repeating the moving and the calculating until the score meets a threshold; and storing the modified sub-layouts in a tangible computer-readable medium for use by a further IC process stage.

2. The method of claim 1, wherein the evaluation index includes one or more factors selected from the group consisting of: critical dimension (CD) variation budget, overlay budget, depth of focus, intensity log slope, mask error enhancement factor, data error enhancement factor, minimal area, minimal CD, and minimal spacing.

3. The method of claim 2, wherein the evaluation index is weighted.

4. The method of claim 1, wherein the score meets the threshold when the score reaches a local optimum.

5. The method of claim 1, wherein the score is calculated on the modified sub-layouts collectively and the threshold is defined for the modified sub-layouts collectively.

6. The method of claim 1, wherein the modified sub-layouts include a first modified sub-layout and a second modified sub-layout, further comprising:
forming a first mask using the first modified sub-layout;
forming a second mask using the second modified sub-layout;
performing a first photolithography process to a wafer using the first mask; and
performing a second photolithography process to the wafer using the second mask.

7. The method of claim 6, wherein each of the first and second photolithography processes uses one of:
an ultraviolet (UV) lithography process; and
an extreme ultraviolet (EUV) lithography process.

8. The method of claim 1, wherein the modified sub-layouts include a first modified sub-layout and a second modified sub-layout, further comprising:
performing a first maskless photolithography process to a wafer using the first modified sub-layout; and
performing a second maskless photolithography process to the wafer using the second modified sub-layout.

9. The method of claim 1, wherein the modified sub-layouts include a main layout and a cut layout.

10. The method of claim 1, further comprising:
performing optical proximity correction (OPC) to the modified sub-layouts separately.

11. A method comprising:
receiving a target layout of an integrated circuit (IC);
decomposing the target layout into first and second sub-layouts, wherein polygon patterns of the first sub-layout overlap with polygon patterns of the second sub-layout, the first and second sub-layouts include first and second pluralities of re-locatable edges respectively, and each of the re-locatable edges is associated with a respective region of freedom where each of the re-locatable edges can be placed;
performing an edge-relocation process to the first and second pluralities of re-locatable edges thereby resulting in first and second modified sub-layouts respectively, wherein the edge-relocation process includes:
choosing an evaluation index based on a target manufacturing process,
moving one or more of the re-locatable edges in their respective regions of freedom, wherein the moving of the one or more of the re-locatable edges has an impact on a value of the evaluation index,
calculating a score of manufacturability based on the evaluation index and the re-locatable edges, and
repeating the moving and the calculating until the score of manufacturability meets a threshold;
forming a first mask using the first modified sub-layout; and
forming a second mask using the second modified sub-layout, wherein the first and second masks are to be used in first and second manufacturing processes to a wafer to collectively form the IC.

12. The method of claim 11, wherein the evaluation index includes edge placement errors for edges that are not re-locatable.

13. The method of claim 11, wherein the evaluation index includes one or more factors selected from the group consisting of: critical dimension (CD) variation budget, overlay budget, depth of focus, intensity log slope, mask error enhancement factor, minimal area, minimal CD, and minimal spacing.

14. The method of claim 11, wherein the moving of the one or more edges includes:
fixing the first plurality of re-locatable edges in their respective initial locations; and
moving the second plurality of re-locatable edges in their respective regions of freedom.

15. The method of claim 11, wherein each of the polygon patterns of the first and second sub-layouts is a rectangle.

16. The method of claim 11, wherein each of the polygon patterns of the first and second sub-layouts includes at most one re-locatable edge.

17. The method of claim 11, further comprising:
performing a first optical proximity correction (OPC) process to the first modified sub-layout before the forming of the first mask; and
performing a second optical proximity correction (OPC) process to the second modified sub-layout before the forming of the second mask.

18. A method comprising:
receiving a target layout of an integrated circuit (IC);
decomposing the target layout into a first sub-layout and a second sub-layout, wherein some patterns of the first sub-layout overlaps with some patterns of the second sub-layout;
identifying a plurality of re-locatable edges in the first and second sub-layouts;
associating each of the re-locatable edges with a respective region of freedom where each of the re-locatable edges can be placed;
performing an edge-relocation process to the re-locatable edges thereby resulting in first and second modified sub-layouts respectively, wherein the edge-relocation process includes:
choosing an evaluation index based on a target manufacturing process,
moving one or more of the re-locatable edges in their respective regions of freedom, wherein the moving of the one or more of the re-locatable edges has an impact on a value of the evaluation index, calculating a score of manufacturability based on the evaluation index and the re-locatable edges, and repeating the moving and the calculating until the score of manufacturability reaches a local optimum;

performing a first target manufacturing process to a wafer using the first modified sub-layout; and performing a second target manufacturing process to the wafer using the second modified sub-layout.

19. The method of claim 18, wherein the evaluation index includes one or more factors selected from the group consisting of: critical dimension (CD) variation budget, overlay budget, depth of focus, intensity log slope, mask error enhancement factor, data error enhancement factor, minimal area, minimal CD, and minimal spacing.

20. The method of claim 19, wherein the evaluation index is weighted.

* * * * *